United States Patent
Zhu et al.

(10) Patent No.: US 10,911,802 B2
(45) Date of Patent: Feb. 2, 2021

(54) MEDIA FILE PUSHING METHOD, MEDIA FILE SERVER, AND MEDIA FILE PUSHING SYSTEM

(71) Applicant: Huawei Technologies Co., Ltd., Shenzhen (CN)

(72) Inventors: Yi Zhu, Shenzhen (CN); Rui Li, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/295,593

(22) Filed: Mar. 7, 2019

(65) Prior Publication Data
US 2019/0208238 A1 Jul. 4, 2019

Related U.S. Application Data

(63) Continuation of application No. PCT/CN2017/099366, filed on Aug. 28, 2017.

(30) Foreign Application Priority Data

Sep. 7, 2016 (CN) .......................... 2016 1 0808142

(51) Int. Cl.
*H04N 21/2387* (2011.01)
*H04N 21/25* (2011.01)
(Continued)

(52) U.S. Cl.
CPC ......... *H04N 21/2387* (2013.01); *G06F 16/00* (2019.01); *H04L 65/4061* (2013.01);
(Continued)

(58) Field of Classification Search
None
See application file for complete search history.

(56) References Cited

U.S. PATENT DOCUMENTS 8,626,136 B2 * 1/2014 Ozzie .................... H04W 4/029
455/414.2
8,990,692 B2 * 3/2015 Chelba .................. G06F 16/245
715/719
(Continued)

FOREIGN PATENT DOCUMENTS

CN 103179461 A 6/2013
CN 103546789 A 1/2014
(Continued)

OTHER PUBLICATIONS

Machine Translation and Abstract of Chinese Publication No. CN103179461, Jun. 26, 2013, 5 pages.
(Continued)

*Primary Examiner* — Dhairya A Patel
(74) *Attorney, Agent, or Firm* — Conley Rose, P.C.

(57) ABSTRACT

A media file pushing method, a media file server, and a media file pushing system relate to the field of communications technologies and are configured to resolve a problem that a user cannot quickly obtain a media file satisfying a pushing requirement of the user. The method includes obtaining search information from a user, where the search information includes time information, and the time information indicates a requirement of the user on playback duration of a media file, determining playback content of the media file based on a preset content determining rule, obtaining at least one target media file satisfying the time information and the playback content from a media file resource library based on the time information and the playback content of the media file, and presenting the at least one target media file in a pushing interface.

20 Claims, 5 Drawing Sheets

(51) Int. Cl.
*H04N 21/482* (2011.01)
*G06F 16/00* (2019.01)
*H04N 21/8405* (2011.01)
*H04N 21/258* (2011.01)
*H04L 29/06* (2006.01)
*H04L 29/08* (2006.01)
*H04N 21/234* (2011.01)
*H04N 21/262* (2011.01)

(52) U.S. Cl.
CPC ............ *H04L 67/26* (2013.01); *H04L 67/325* (2013.01); *H04N 21/234* (2013.01); *H04N 21/252* (2013.01); *H04N 21/25891* (2013.01); *H04N 21/26241* (2013.01); *H04N 21/4828* (2013.01); *H04N 21/8405* (2013.01)

(56) References Cited

U.S. PATENT DOCUMENTS

| | | | | |
|---|---|---|---|---|
| 9,966,112 | B1* | 5/2018 | Kulkarni | G11B 27/10 |
| 2002/0188363 | A1* | 12/2002 | Ashy | H04N 5/64 |
| | | | | 700/94 |
| 2005/0125428 | A1* | 6/2005 | Kang | G11B 27/3027 |
| 2005/0144636 | A1* | 6/2005 | Hirai | H04N 21/4622 |
| | | | | 725/35 |
| 2010/0021129 | A1* | 1/2010 | Tezuka | H04N 5/85 |
| | | | | 386/248 |
| 2010/0293466 | A1* | 11/2010 | O'Brien | H04N 21/6587 |
| | | | | 715/723 |
| 2011/0029386 | A1* | 2/2011 | Devries | G06Q 30/0267 |
| | | | | 705/14.64 |
| 2013/0262394 | A1* | 10/2013 | Kumarasamy | G06F 16/164 |
| | | | | 707/673 |
| 2014/0101142 | A1* | 4/2014 | Gomez Uribe | G06F 16/435 |
| | | | | 707/723 |
| 2014/0101192 | A1* | 4/2014 | Sabah | G06F 16/435 |
| | | | | 707/769 |
| 2016/0134900 | A1* | 5/2016 | Wei | H04N 21/85406 |
| | | | | 725/32 |
| 2018/0012075 | A1* | 1/2018 | Okada | H04N 21/8453 |
| 2018/0132011 | A1* | 5/2018 | Shichman | H04N 21/23418 |
| 2019/0208238 | A1* | 7/2019 | Zhu | H04N 21/252 |

FOREIGN PATENT DOCUMENTS

| | | |
|---|---|---|
| CN | 104036018 A | 9/2014 |
| CN | 104598505 A | 5/2015 |
| CN | 104699806 A | 6/2015 |
| CN | 104954820 A | 9/2015 |
| CN | 106412634 A | 2/2017 |
| JP | 5237849 B2 | 7/2013 |

OTHER PUBLICATIONS

Machine Translation and Abstract of Chinese Publication No. CN103546789, Jan. 29, 2014, 16 pages.
Machine Translation and Abstract of Chinese Publication No. CN104036018, Sep. 10, 2014, 22 pages.
Machine Translation and Abstract of Chinese Publication No. CN104598505, May 6, 2015, 12 pages.
Machine Translation and Abstract of Chinese Publication No. CN104699806, Jun. 10, 2015, 16 pages.
Machine Translation and Abstract of Chinese Publication No. CN104954820, Sep. 30, 2015, 26 pages.
Machine Translation and Abstract of Chinese Publication No. CN106412634, Feb. 15, 2017, 22 pages.
Machine Translation and Abstract of Japanese Publication No. JP5237849, Part 1, Jul. 17, 2013, 15 pages.
Machine Translation and Abstract of Japanese Publication No. JP5237849, Part 2, Jul. 17, 2013, 3 pages.
Foreign Communication From a Counterpart Application, PCT Application No. PCT/CN2017/099366, English Translation of International Search Report dated Nov. 20, 2017, 2 pages.
Foreign Communication From a Counterpart Application, PCT Application No. PCT/CN2017/099366, English Translation of Written Opinion dated Nov. 20, 2017, 5 pages.

* cited by examiner

MEDIA FILE PUSHING METHOD, MEDIA FILE SERVER, AND MEDIA FILE PUSHING SYSTEM

CROSS-REFERENCE TO RELATED APPLICATIONS

This application is a continuation of International Patent Application No. PCT/CN2017/099366 filed on Aug. 28, 2017, which claims priority to Chinese Patent Application No. 201610808142.X filed on Sep. 7, 2016. The disclosures of the aforementioned applications are hereby incorporated by reference in their entireties.

TECHNICAL FIELD

This application relates to the field of communications technologies, and in particular, to a media file pushing method, a media file server, and a media file pushing system.

BACKGROUND

When a user watches a video using a terminal such as a mobile phone or a computer, the following application scenario may exist. The user has no time to watch an entire video program, for example, an entire movie, but watches some short video programs using short fragmented time, for example, watches a news program, a funny video, or an essential part of a movie at breakfast time. In this case, the user enters a key word on the terminal to search for a video satisfying a requirement of the user.

In other approaches, after the user enters the key word on the terminal, videos pushed by the terminal to the user may not satisfy a watching requirement of the user, and the user still needs to screen the videos. For example, the user wants to watch a video about local news for about 10 minutes. When the user enters a key word "news," a video server may push all news videos, and playback duration of the videos varies. In this case, the user still needs to click/tap a video details page to view video duration information, or duration information is displayed using a playback control bar after a video is played back to further obtain, through screening, a video satisfying a duration requirement of the user. In this case, the user may give up watching due to time consumed for searching for a related video.

SUMMARY

This application provides a media file pushing method, a media file server, and a media file pushing system to resolve a problem that a user cannot quickly obtain a media file satisfying a pushing requirement of the user.

To achieve the foregoing objective, the following technical solutions are used in this application.

According to one aspect, this application provides a media file pushing method, including obtaining search information entered by a user, where the search information includes at least time information, and the time information indicates a requirement of the user on playback duration of a media file, determining playback content of the media file based on a preset content determining rule, obtaining at least one target media file that satisfies the time information and the playback content from a media file resource library based on the time information and the playback content of the media file, and presenting the at least one target media file in a pushing interface.

The time information included in the search information may be a time range or fixed duration.

Optionally, the search information may be a search key word from the user, and the search key word includes at least a duration key word. For example, the user enters a search key word "10 minutes+news," "10 minutes" is a duration key word, and "news" is a content key word.

Optionally, when the user searches for a media file using a terminal, the terminal displays a plurality of time-based search fields for the user to select. Therefore, the search information entered by the user may further be a search field selected by the user from all time-based search fields displayed by the terminal. For example, the terminal displays the following time-based search fields: "breakfast," "afternoon tea," and "dinner," and the user may select any one of the search fields.

As can be learned, compared with the other approaches in which the user cannot quickly obtain a media file satisfying a pushing requirement of the user, in this application, a media file server can determine the requirement of the user on the playback duration of the media file based on the time information in the search information entered by the user, determine the playback content of the media file based on the preset content determining rule, and further push, to the user, only the at least one media file that satisfies the duration requirement and the playback content, but does not push another media file that does not satisfy the pushing requirement such that time consumed by the user to search for the media file can be reduced, and the user can quickly obtain the media file satisfying the pushing requirement of the user, thereby improving user experience.

In a possible design, when the search information entered by the user includes only the time information, when determining the playback content of the media file, the media file server determines, based on a historical playback record of the user, at least one content category whose playback frequency of the user satisfies a preset requirement, and determines any one of the at least one content category as a target content category, and determines playback content satisfying the target content category as the playback content of the media file. For example, if the search information entered by the user is "10 minutes," the media file server can only determine, based on the search information, that the requirement of the user on the duration of the media file is "10 minutes." To determine the playback content of the media file, the media file server determines, by viewing a historical watching record of the user, that the user usually watches media files of a variety and entertainment category and a sports category. Then, the media file server may determine the variety and entertainment category or the sports category as the target content category, and determine playback content belonging to the target content category as the playback content of the media file.

In this embodiment, the media file server can determine the target content category of the media file based on the historical playback record of the user, and further determine the playback content satisfying the target content category as the playback content of the media file. The playback content that is of the media file and that is determined using this implementation is based on the historical playback record of the user, and can be closer to an actual requirement of the user. Further, the media file server pushes, to the user, only the at least one media file that satisfies the time information and the playback content, but does not push another media file that does not satisfy the pushing requirement such that the time consumed by the user to search for the media file can be reduced, and the user can quickly obtain the media file satisfying the pushing requirement of the user, thereby improving user experience.

In a possible design, when the search information entered by the user includes only the time information, and the media file server stores a content category pre-stored by the user, when the playback content of the media file is determined, a preset content category is determined as the target content category, and playback content satisfying the target content category is determined as the playback content of the media file.

In this embodiment, the media file server can determine the pre-stored content category as the target content category, and further determine the playback content satisfying the target content category as the playback content of the media file. The playback content that is of the media file and that is determined using this implementation is based on user setting, and can satisfy a requirement of the user on the playback content. Further, the media file server pushes, to the user, only the at least one media file that satisfies the time information and the playback content, but does not push another media file that does not satisfy the pushing requirement such that the time consumed by the user to search for the media file can be reduced, and the user can quickly obtain the media file satisfying the pushing requirement of the user, thereby improving user experience.

In a possible design, when the search information entered by the user further includes a content key word, when the playback content of the media file is determined, playback content including the content key word is determined as the playback content of the media file based on the content key word. For example, if the search information entered by the user is a search key word "10 minutes+news," the media file server can determine, based on "10 minutes," that the requirement of the user on the duration of the media file is 10 minutes, and determine, based on "news," that a requirement of the user on content of the media file is a media file of a news category.

In this embodiment, the media file server can determine the playback content of the media file based on the content key word entered by the user. The playback content that is of the media file and that is determined using this implementation is based on the content key word entered by the user, and can satisfy the requirement of the user on the playback content. Further, the media file server pushes, to the user, only the at least one media file that satisfies the time information and the playback content, but does not push another media file that does not satisfy the pushing requirement such that the time consumed by the user to search for the media file can be reduced, and the user can quickly obtain the media file satisfying the pushing requirement of the user, thereby improving user experience.

In a possible design, obtaining at least one target media file that satisfies the time information and the playback content from a media file resource library based on the time information and the playback content of the media file further includes searching the media file resource library to determine whether the media file resource library includes the target media file that satisfies the time information and the playback content, and editing at least one media file whose playback frequency satisfies the preset requirement into the target media file that satisfies the time information and the playback content if the media file resource library does not include the target media file.

In this embodiment, when the target media file is obtained from the media file resource library, if the media file that satisfies the time information and the playback content can be found, the found media file may be used as a to-be-pushed target media file. If the media file cannot be found, a media file having a relatively high playback frequency may be edited to obtain the target media file that satisfies the time information and the playback content. Further, only the at least one media file that satisfies the time information and the playback content is pushed to the user, and another media file that does not satisfy the pushing requirement is not pushed such that the time consumed by the user to search for the media file can be reduced, and the user can quickly obtain the media file satisfying the pushing requirement of the user, thereby improving user experience.

In a possible design, when presenting the at least one target media file in the pushing interface, the media file server pushes a plurality of target media files based on playback popularity or quantities of playback times such that the user selects, from the plurality of target media files, a media file that the user intends to play back.

In this embodiment, the media file server can push the target media files to the user based on the playback popularity and the quantities of playback times of media files, and further push, to the user, only the at least one media file that satisfies the time information and the playback content, but does not push another media file that does not satisfy the pushing requirement such that the user selects, from the target media files, the media file that the user intends to play back. Therefore, the time consumed by the user to search for the media file can be reduced, and the user can quickly obtain the media file satisfying the pushing requirement of the user, thereby improving user experience.

According to another aspect, this application further provides a media file server, capable of implementing functions performed by the media file server in the method example. The functions may be implemented using hardware, or by hardware executing corresponding software. The hardware or the software includes one or more modules corresponding to the foregoing functions.

In a possible design, a structure of the media file server includes a processor and a transceiver, and the processor is configured to support the media file server in performing the corresponding functions in the method. The transceiver is configured to support communication between the media file server and another network element. The media file server may further include a memory. The memory is coupled to the processor, and stores a program instruction and data that are required by the media file server.

According to still another aspect, this application provides a computer storage medium configured to store a computer software instruction used by the media file server, and the computer software instruction includes a program designed to perform the foregoing aspect.

According to yet another aspect, this application provides a media file pushing system, including the media file server provided in this application and a terminal. The terminal is configured to display at least one target media file pushed by the media file server.

In the media file pushing method, the media file server, and the media file pushing system that are provided in this application, compared with the other approaches in which the user cannot quickly obtain the media file satisfying the pushing requirement of the user, in this application, the media file server can determine the requirement of the user on the duration of the media file using the time information in the search information entered by the user, determine the playback content of the media file based on the preset content determining rule, and further push, to the user, only the media file that satisfies the duration requirement and the playback content, but does not push another media file that does not satisfy the pushing requirement such that the time consumed by the user to search for the media file can be reduced, and the user can quickly obtain the media file satisfying the pushing requirement of the user, thereby improving user experience.

BRIEF DESCRIPTION OF DRAWINGS

To describe the technical solutions in some of the embodiments of this application art more clearly, the following briefly describes the accompanying drawings describing some of the embodiments. The accompanying drawings in the following description show merely some embodiments of this application, and a person of ordinary skill in the art may still derive other drawings from these accompanying drawings without creative efforts.

DESCRIPTION OF EMBODIMENTS

The following clearly describes the technical solutions in the embodiments with reference to the accompanying drawings in the embodiments.

A media file pushing method provided in the embodiments of this application may be applied to an application scenario in which a user plays back a media file using a terminal.

Figure 1:
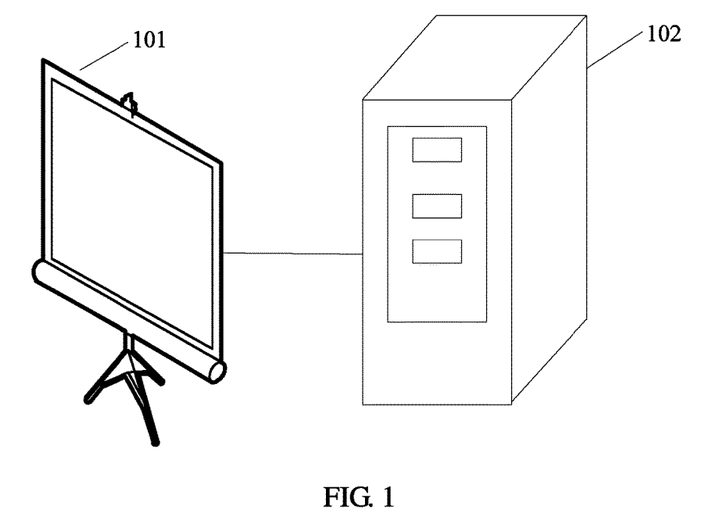
FIG. 1 is a schematic structural diagram of a media file pushing system according to an embodiment of this application.

As shown in FIG. 1, an embodiment of this application provides a media file pushing system applied to this application scenario. The media file pushing system includes a terminal 101 and a media file server 102.

The terminal 101 may be any device having a media file searching and playback function, for example, a mobile phone, a tablet computer, or a smart television. The media file server 102 can communicate with the terminal 101 and push a media file to the terminal 101.

The media file pushing method provided in the embodiments of this application may further be applied to an application scenario of air sharing. Air sharing means that a series of operations such as transmission, parsing, presentation, and controlling of multimedia content may be performed on different multimedia terminals using an Intelligent Grouping and Resource Sharing protocol, the Miracast protocol, and the like and using a WI-FI network connection to share presented content on different platform devices, and enrich a multimedia life of a user. For example, after the air sharing technology is used, a movie on a mobile phone can be played back on a television, an image on a tablet computer can be shared on a television, and content on a computer can be projected to a television.

Figure 2:
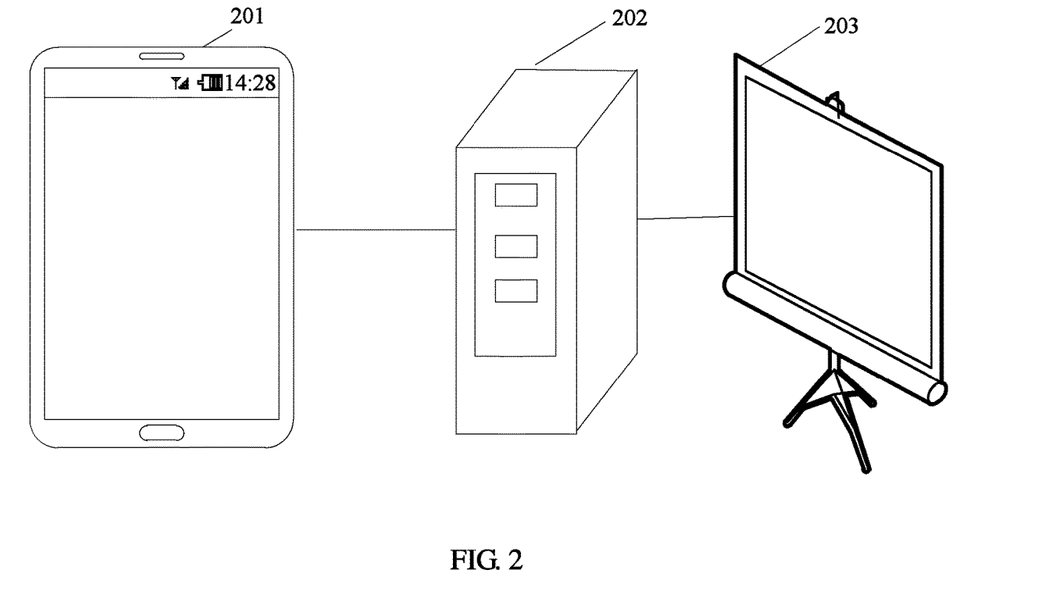
FIG. 2 is a schematic structural diagram of another media file pushing system according to an embodiment of this application.

As shown in FIG. 2, an embodiment of this application provides a media file pushing system applied to the application scenario of air sharing. The media file pushing system includes a first terminal 201, a media file server 202, and a second terminal 203.

The first terminal 201 may be a device such as a mobile phone, a smart band, a tablet computer, or an intelligent remote control. The media file server 202 is configured to find a media file based on search information that is entered by a user using the first terminal 201, and push the media file to the second terminal 203. The second terminal 203 may be a device such as a smart television including a set top box, a tablet computer, or a mobile phone, and is configured to play back the media file pushed by the media file server 202.

An embodiment of this application provides a media file pushing method. The media file pushing method may be performed by the media file server shown in FIG. 1 or FIG. 2. This embodiment of this application is described using an example in which the media file pushing method provided in this embodiment of this application is applied to the system architecture shown in FIG. 2. In addition, a media file in this embodiment of this application includes various files such as an audio file, a video file, and an image file. This embodiment of this application is described using an example in which the media file is a video file.

Figure 3:
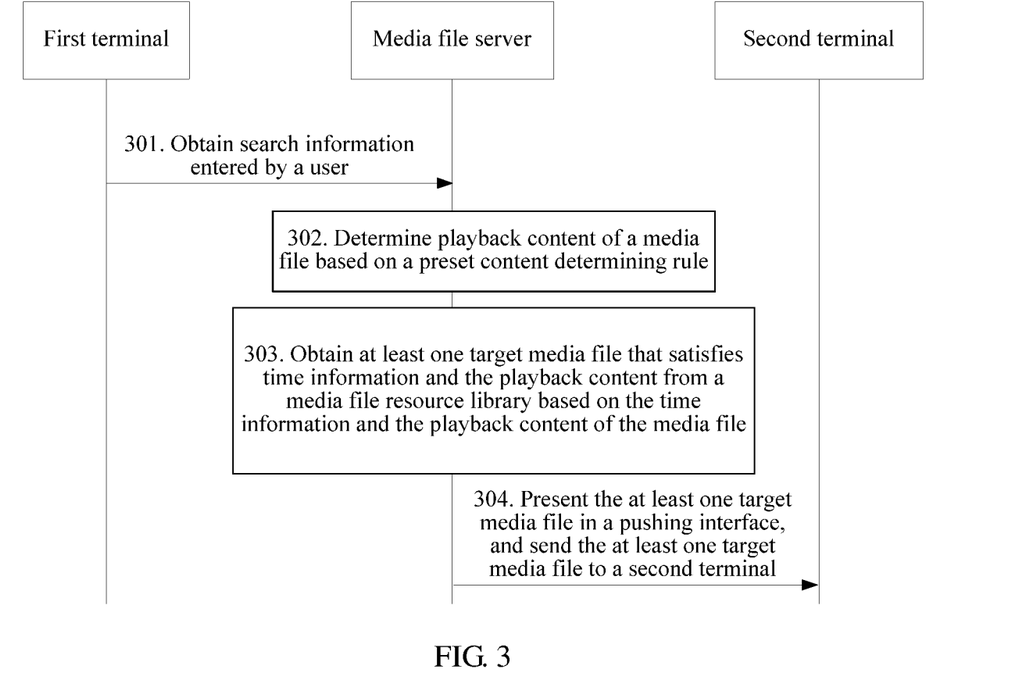
FIG. 3 is a schematic flowchart of a media file pushing method according to an embodiment of this application.

As shown in FIG. 3, the method includes the following steps.

Step 301. The media file server obtains search information that is entered by a user using a first terminal.

The search information includes at least time information, and the time information is used to indicate a requirement of the user on duration of a media file. Further, the time information may be a time range, a fixed time value, or a time-based search field. When the time information is a time range, for example, "10 minutes to 30 minutes," it may be determined that the requirement of the user on the duration of the media file is a media file whose playback duration is "10 minutes to 30 minutes." When the time information is a fixed time value, the requirement of the user on the duration of the media file is a time range of fluctuation about the time value. For example, if the time information is "30 minutes," it may be determined that the requirement of the user on the duration of the media file is a media file whose playback duration is about 30 minutes, for example, 25 minutes to 35 minutes. When the time information is a time-based search field, for example, afternoon tea or breakfast, the requirement that is indicated by the time information and that is of the user on the duration of the media file is a statistical value based on the time scenario. For example, breakfast time of the user is usually 10 minutes to 30 minutes, and the indicated duration requirement is 10 minutes to 30 minutes.

Optionally, the search information may further include a content key word related to a to-be-pushed media file, for example, a name of the media file, or a name of an actor in the media file. The content key word is used to indicate a requirement of the user on content of the media file.

In a specific embodiment, the search information entered by the user may be a search key word entered by the user, and the search key word includes at least a time key word.

Figure 4:
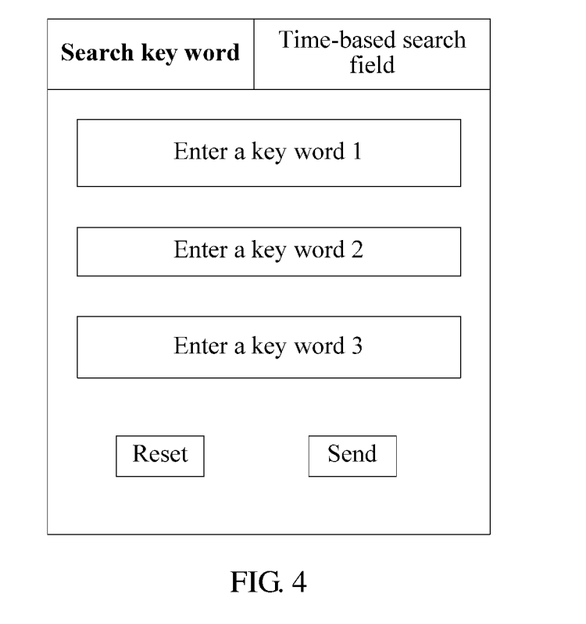
FIG. 4 is a schematic diagram of an interface used for entering search information on a terminal according to an embodiment of this application.

As shown in FIG. 4, an embodiment of this application provides a schematic diagram of an interface used for entering search information on the first terminal. When the user intends to search for the media file in a manner of entering a key word, after selecting "Search key word" by clicking/tapping, the user may enter corresponding key words on locations, for example, "Enter a key word 1," "Enter a key word 2," and "Enter a key word 3" in FIG. 4, on corresponding search boxes on a popup interface. After determining that the entered search key words are correct, the user may click/tap "Send" to trigger the first terminal to send the search information to the media file server. The user may alternatively click/tap a reset button to re-enter a key word.

For example, the search information may be a search key word including a plurality of key word fields entered by the user on the search boxes displayed by the first terminal 201, for example, "10 minutes+news," or "half an hour+the Titanic." "10 minutes" and "half an hour" are time information, and may indicate a requirement of the user on watching duration of the media file, and "news" and "the Titanic" are content key words, and may indicate the requirement of the user on the content of the media file.

Figure 5:
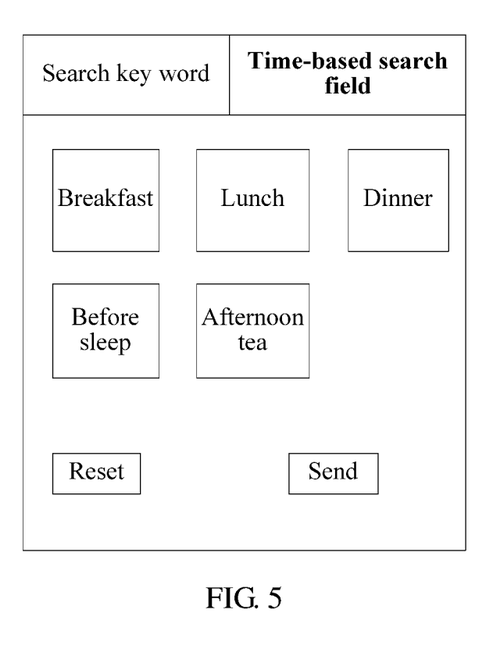
FIG. 5 is a schematic diagram of another interface used for entering search information on a terminal according to an embodiment of this application.

In another specific embodiment, when the user searches for the media file using the first terminal 201, the first terminal 201 displays a plurality of time-based search fields for the user to select. The search information is a time-based search field selected by the user.

As shown in FIG. 5, an embodiment of this application provides a schematic diagram of another interface used for entering search information on the first terminal. When the user intends to search for the media file by selecting a time-based search field, after selecting "Time-based search field" by clicking/tapping, the user may select a time-based search field from a plurality of search fields displayed on a popup interface, for example, breakfast, lunch, and afternoon tea. After determining that the selected search field is correct, the user may click/tap Send, to trigger the first terminal to send the search information to the media file server. The user may alternatively click/tap a reset button to re-select a time-based search field.

It should be noted that when the method is applied to the system shown in FIG. 1, the search information is search information that is entered by the user using the terminal 101.

Step 302. The media file server determines playback content of a media file based on a preset content determining rule.

When the search information entered by the user includes only the time information, when the playback content of the media file is determined, first, a target content category of the media file may be determined, and then, playback content satisfying the target content category is determined as playback content of a to-be-pushed media file.

When the media file server stores a content category pre-stored by the user, the target content category may be a preset content category.

For example, if the preset content category is a variety and entertainment category, playback content belonging to the variety and entertainment category is directly determined as the playback content of the to-be-pushed media file.

The target content category may alternatively be a target content category that is determined by the media file server based on a particular rule. For a specific implementation process, refer to the following specification.

When the search information entered by the user further includes the content key word, when the playback content of the media file is determined, playback content including the content key word is determined as the playback content of the media file based on the content key word. For example, if the search information entered by the user is the search key word "10 minutes+the Titanic," the media file server can determine, based on "10 minutes," that the requirement of the user on the duration of the media file is 10 minutes, and determine, based on "the Titanic," that the playback content of the media file is playback content related to the Titanic.

Step 303. The media file server obtains at least one target media file that satisfies time information and the playback content from a media file resource library based on the time information and the playback content of the media file.

Media files stored in the media file resource library are various media file segments having different duration and edited by an operator or a content provider. When the target media file is obtained from the media file resource library, if the media file that satisfies the time information and the playback content can be found, the found media file may be used as the to-be-pushed target media file, or if the media file that satisfies the time information and the playback content cannot be found, at least one media file whose playback frequency satisfies a preset requirement may be edited to obtain the target media file that satisfies the time information and the playback content.

For example, if the requirement of the user on the duration of the media file is half an hour, and the requirement on the content of the media file is a movie A, statistics are collected on content or segments that a plurality of users watch when they watch the movie A within half an hour, and one or more media file segments having relatively high watching frequencies are edited into a target media file having duration of half an hour.

Step 304. The media file server presents the at least one target media file in a pushing interface, and sends the at least one target media file to a second terminal.

In an embodiment, if there are a plurality of target media files, the target media files are sequentially presented in the pushing interface based on playback popularity or quantities of playback times such that the user selects, from the plurality of target media files, a media file that the user intends to play back.

It should be noted that when the method is applied to the system architecture shown in FIG. 1, the media file server 102 may push a plurality of target media files to the terminal 101.

In the media file pushing method provided in this application, compared with the other approaches in which the user cannot quickly obtain a media file satisfying a pushing requirement of the user, in this application, the media file server can determine the requirement of the user on the duration of the media file using the time information in the search information entered by the user, determine the playback content of the media file based on the preset content determining rule, and further push, to the user, only the media file that satisfies the duration requirement and the playback content, but does not push another media file that does not satisfy the pushing requirement such that time consumed by the user to search for the media file can be reduced, and the user can quickly obtain the media file satisfying the pushing requirement of the user, thereby improving user experience.

Figure 6:
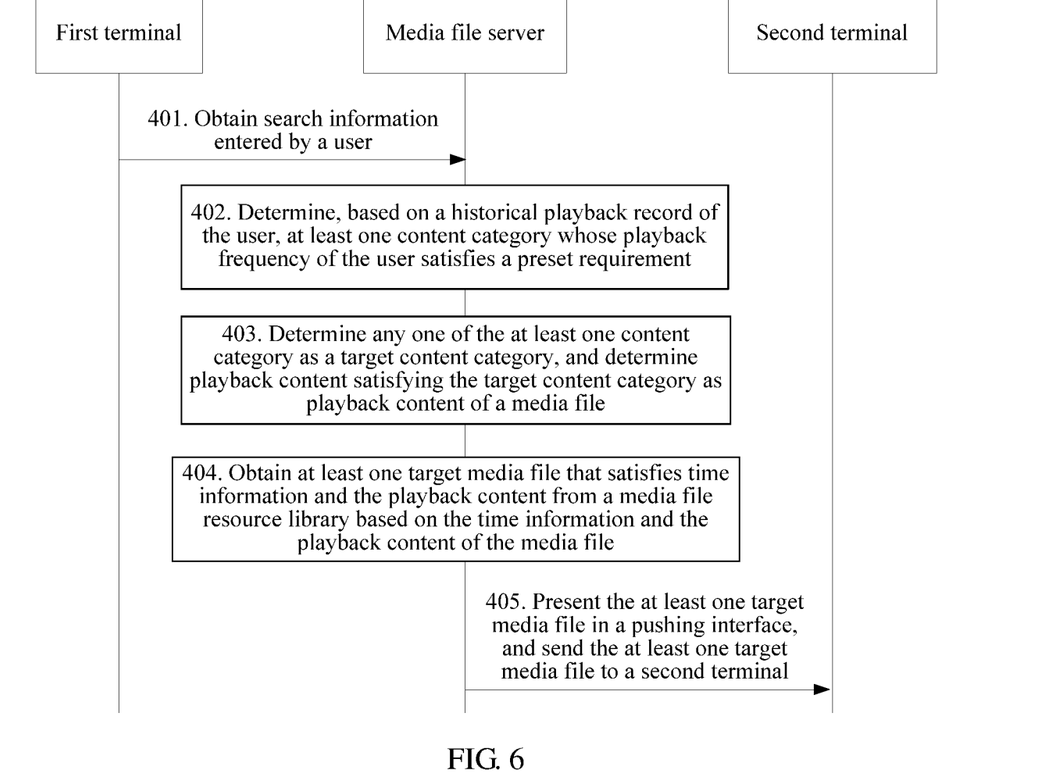
FIG. 6 is a schematic flowchart of another media file pushing method according to an embodiment of this application.

As shown in FIG. 6, an embodiment of this application further provides a media file pushing method. The method is applied to an application scenario in which search information includes only time information. The method includes the following steps.

Step 401. A media file server obtains search information that is entered by a user using a first terminal, where the search information includes at least time information, and the time information indicates a requirement of the user on playback duration of a media file.

For a specific implementation process of this step, refer to step 301, and details are not described herein again.

Step 402. Determine, based on a historical playback record of the user, at least one content category whose playback frequency of the user satisfies a preset requirement.

The historical playback record of the user may be a playback record within a time period, for example, one month or two weeks. The preset requirement may be a requirement on a quantity of times, and that the playback frequency satisfies the preset requirement means that the playback frequency is greater than or equal to a particular quantity of times.

During specific implementation, in an embodiment, a category to which media files that the user usually watches belong may be determined based on the historical playback record using a big data statistics method.

For example, it may be learned, by collecting statistics on a watching record of the user within one month, that within this time period, the user watches programs of a variety and entertainment category for n1 times, watches programs of a sports category for n2 times, watches programs of a news category for n3 times, and watches emotional television series for n4 times. If n1 and n3 both are greater than the preset requirement on the quantity of times, it is determined that target content categories corresponding to a user A are the variety and entertainment category and the news category.

Step 403. The media file server determines any one of the at least one content category as a target content category, and determines playback content satisfying the target content category as playback content of the media file.

Optionally, media file content watched by some users is similar, and it may be considered that the users belong to a same target content category. Then, a media file played back by another user belonging to the same target content category is determined as the playback content of the media file based on a watching record of the another user. For example, the user A and a user B usually watch media files of the variety and entertainment category. When a media file is pushed to the user A, a media file that the user B has watched but the user A does not watch may be determined, based on a watching record of the user B, as the media file to be pushed to the user A.

Step 404. The media file server obtains at least one target media file that satisfies the time information and the playback content from a media file resource library based on the time information and the playback content of the media file.

For a specific implementation process of this step, refer to step 303, and details are not described herein again.

Step 405. The media file server presents the at least one target media file in a pushing interface, and sends the at least one target media file to a second terminal.

For a specific implementation process of this step, refer to step 304, and details are not described herein again.

Optionally, when the target content category corresponding to the user is determined, watching time corresponding to the user may further be determined, to obtain a target content category corresponding to the watching time. Then, when the time information included in the search information is a time-based search field selected by the user, a media file corresponding to the time information can be pushed.

For example, it may be learned, by collecting statistics on a historical playback record of the user within one month, that a media file category of the user corresponding to breakfast time is a news category, a media file category corresponding to afternoon tea time (three o'clock to five o'clock pm) is an entertainment category, a media file category corresponding to dinner time is an emotional television series category, and a media file category corresponding to time (nine o'clock to 12 o'clock pm) before the user goes to sleep is a movie category. When the time information entered by the user is the afternoon tea, a media file corresponding to the afternoon tea is presented in the pushing interface.

In the media file pushing method provided in this embodiment of this application, when the search information entered by the user includes only the time information, to be specific, a clear requirement is imposed only on duration of a to-be-pushed media file, but is not imposed on content of the to-be-pushed media file, statistics are collected on the historical playback record of the user, a target content category that the user usually watches is determined based on the historical playback record, playback content of the target content category is determined as playback content of the to-be-pushed media file, and a media file that satisfies the time information and the content category is pushed. The media file pushed using this implementation can be closer to an actual pushing requirement of the user, thereby improving user experience.

The foregoing describes the solutions provided in the embodiments of this application mainly from the perspective of interaction between network elements. It may be understood that to implement the foregoing functions, each network element, for example, the media file server, includes corresponding hardware structures and/or software modules performing the functions. A person skilled in the art should be easily aware that, in combination with the units and algorithm steps of the examples described in the embodiments disclosed in this specification, this application can be implemented by hardware or a combination of hardware and computer software. Whether a function is performed by hardware or by computer software driving hardware depends on particular applications and design constraint conditions of the technical solutions. A technician may use different methods to implement the described functions for the particular applications, but it should not be considered that this implementation goes beyond the scope of this application.

In the embodiments of this application, module or unit division may be performed on the media file server based on the example of the method. For example, each function module may be obtained through division for each corresponding function, or at least two functions may be integrated into one processing module. The integrated module may be implemented in a form of hardware, or may be implemented in a form of a software function module. It should be noted that module division in the embodiments of this application is an example and is merely logical function division. During actual implementation, there may be another division manner.

Figure 7:
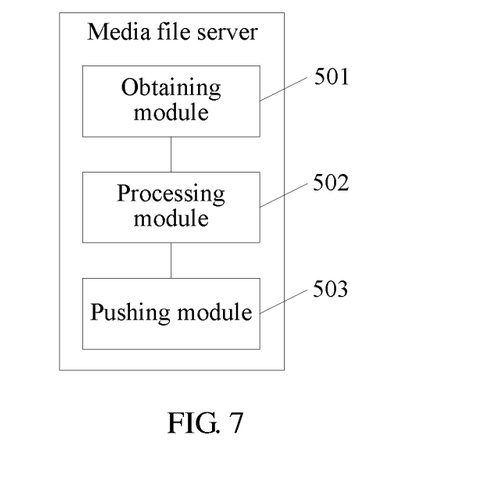
FIG. 7 is a schematic structural diagram of a media file server according to an embodiment of this application.

When each function module is obtained through division for each corresponding function, as shown in FIG. 7, an embodiment of this application further provides a schematic diagram of a possible structure of the media file server 102 or the media file server 202 used in the foregoing embodiment. The media file server includes an obtaining module 501, a processing module 502, and a pushing module 503. The obtaining module 501 is configured to support the media file server in performing step 301 in FIG. 3 and step 401 in FIG. 6, to be specific, obtain search information that is entered by a user using a first terminal, where the search information includes time information, and the time information is used to indicate a requirement of the user on duration of a media file. The processing module 502 is configured to support the media file server in performing step 302 and step 303 in FIG. 3, to be specific, determine playback content of the media file based on a preset content determining rule, and obtain at least one target media file that satisfies the time information and the playback content from a media file resource library based on the time information and the playback content of the media file. The processing module 502 is further configured to support the media file server in performing step 402, step 403, and step 404 in FIG. 6. The pushing module 503 is configured to support the media file server in performing step 304 in FIG. 3 and step 405 in FIG. 6, to be specific, present the at least one target media file in a pushing interface, and send the at least one target media file to a second terminal. All related content of the steps in the foregoing method embodiments may be referred to for the function descriptions of the corresponding function modules. Details are not described herein again.

Figure 8:
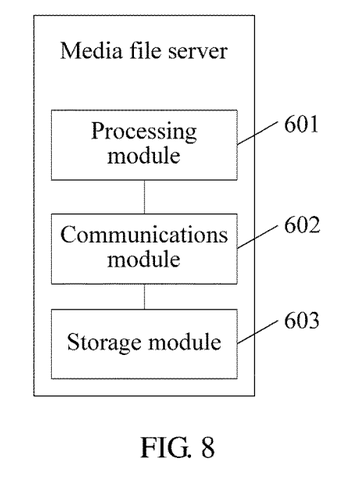
FIG. 8 is a schematic structural diagram of another media file server according to an embodiment of this application.

When an integrated unit is used, as shown in FIG. 8, an embodiment of this application further provides a schematic diagram of a possible structure used in the foregoing embodiment. The media file server includes a processing module 601 and a communications module 602. The processing module 601 is configured to control and manage an action of the media file server. For example, the processing module 601 is configured to support the media file server in performing processes steps 301, 302, 303, and 304 in FIG. 3, processes steps 401, 402, 403, 404, and 405 in FIG. 4, and/or other processes of the technology described in this specification. The communications module 602 is configured to support communication between the media file server and another network entity, for example, communication between a function module shown in FIG. 1 or FIG. 2 and a network entity. The media file server may further include a storage module 603 configured to store program code and data of the media file server.

The processing module 601 may be a processor or a controller, for example, may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The processing module 601 may implement or execute various example logical blocks, modules, and circuits that are described with reference to the content disclosed in this application. The processing module 601 may also be a combination of computing functions, for example, a combination of one or more microprocessors or a combination of a DSP and a microprocessor. The communications module 602 may be a transceiver, a transmission/receiving circuit, a communications interface, or the like. The storage module 603 may be a memory.

Figure 9:
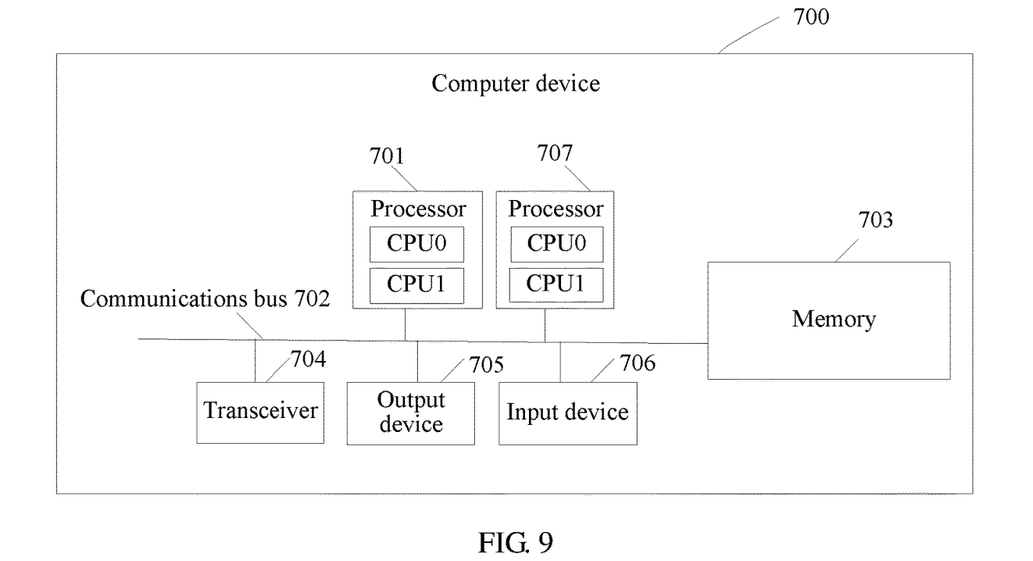
FIG. 9 is a schematic structural diagram of a computer device according to an embodiment of this application.

When the processing module 601 is a processor, the communications module 602 is a transceiver, and the storage module 603 is a memory, the media file server used in this embodiment of this application may be a computer device shown in FIG. 9.

As shown in FIG. 9, an embodiment of this application provides a computer device 700, including at least one processor 701, a communications bus 702, a memory 703, and at least one transceiver 704. The processor 701, the memory 703, and the at least one transceiver 704 are connected using the communications bus 702.

The processor 701 may be a general-purpose CPU, a microprocessor, an ASIC, or one or more integrated circuits configured to control program execution in the solutions of this application.

The communications bus 702 may include a path for transmitting information between the components. The transceiver 704 is configured to communicate with another device or a communications network such as the Ethernet, a radio access network (RAN), or a wireless local area network (WLAN).

The memory 703 may be a read-only memory (ROM) or another type of static storage device capable of storing static information and instructions, a random access memory (RAM) or another type of dynamic storage device capable of storing information and instructions, or may be an electrically erasable programmable ROM (EEPROM), a compact disc ROM (CD-ROM), or other compact disc storage or optical disc storage (including a compressed optical disc, a laser disc, an optical disc, a digital universal optical disc, a BLU-RAY disc, and the like), a magnetic disk storage medium or another magnetic storage device, or any other medium capable of carrying or storing expected program code in a form of instructions or data structures and capable of being accessed by a computer, but is not limited thereto. The memory 703 may independently exist and be connected to the processor using the bus. Alternatively, the memory 703 may be integrated with the processor 701.

The memory 703 is configured to store application program code for execution of the solution of this application, and the execution is controlled by the processor 701. The processor 701 is configured to execute the application program code stored in the memory 703.

During specific implementation, in an embodiment, the processor 701 may include one or more CPUs, for example, a CPU 0 and a CPU 1 in FIG. 9.

During specific implementation, in an embodiment, the computer device 700 may include a plurality of processors such as the processor 701 and a processor 707 in FIG. 9. Each of these processors may be a single-core (single-CPU) processor, or may be a multi-core (multi-CPU) processor. Herein, the processors 701 and 707 may be one or more devices, circuits, and/or processing cores used to process data (for example, a computer program instruction).

During specific implementation, in an embodiment, the computer device 700 may further include an output device 705 and an input device 706. The output device 705 communicates with the processor 701, and may display information in various manners. For example, the output device 705 may be a liquid crystal display (LCD), a light emitting diode (LED) display device, a cathode ray tube (CRT) display device, a projector, or the like. The input device 706 communicates with the processor 701, and may receive an input of a user in various manners. For example, the input device 706 may be a mouse, a keyboard, a touchscreen device, a sensing device, or the like.

The computer device 700 may be a general-purpose computer device or a dedicated computer device. During specific implementation, the computer device 700 may be a desktop computer, a portable computer, a network server, a personal digital assistant (PDA), a mobile phone, a tablet computer, a wireless terminal device, a communications device, an embedded device, or a device having a structure similar to that in FIG. 9. This embodiment of this application does not limit a type of the computer device 700.

The methods or algorithm steps described with reference to the content disclosed in this application may be implemented in a hardware manner, or may be implemented in a manner of executing a software instruction by a processor. The software instruction may include a corresponding software module. The software module may be stored in a RAM, a flash memory, a ROM, an erasable programmable ROM (EPROM), an EEPROM, a register, a hard disk, a removable hard disk, a CD-ROM, or a storage medium in any other forms well-known in the art. A storage medium used as an example is coupled to the processor such that the processor can read information from the storage medium, and can write information into the storage medium. Certainly, the storage medium may be a part of the processor. The processor and the storage medium may be located in an ASIC.

A person of skill in the art should be aware that in one or more of the foregoing examples, the functions described in this application may be implemented using hardware, software, firmware, or any combination thereof. When this application is implemented by software, these functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general or dedicated computer.

The objectives, technical solutions, and benefits of this application are further described in detail in the foregoing specific embodiments. It should be understood that the foregoing descriptions are merely specific embodiments of this application, but are not intended to limit the protection scope of this application. Any modification or improvement made based on the technical solutions of this application shall fall within the protection scope of this application.

What is claimed is:

1. A media file pushing method implemented by a media file server, comprising:
   obtaining search information from a user using a terminal, wherein the search information comprises time information, and wherein the time information indicates a requirement of the user on playback duration of a media file, wherein obtaining the search information comprises:
      displaying, on the terminal, a plurality of time-based search fields for the user; and
      enabling the user to select a time-based search field of the plurality of time-based search fields for searching the media file;
   determining playback content of the media file based on a preset content determining rule;
   obtaining a target media file satisfying the time information and the playback content from a media file resource library based on the time information and the playback content of the media file, wherein obtaining the target media file comprises:
      searching the media file resource library to determine whether the media file resource library comprises the target media file satisfying the time information and the playback content; and
      when the media file resource library does not comprise the target media file satisfying the time information and the playback content,
         collecting statistics on the time information and the playback content of at least one media file having viewing frequency greater than or equal to a particular quantity of times; and
         editing the at least one media file into the target media file satisfying the time information and the playback content; and
   presenting, on the terminal, the target media file in a pushing interface.

2. The media file pushing method of claim 1, wherein determining the playback content of the media file comprises:
   determining, based on a historical playback record of the user, at least one content category whose playback frequency of the user satisfies a preset requirement;
   determining any one of the at least one content category as a target content category; and
   determining playback content satisfying the target content category as the playback content of the media file.

3. The media file pushing method of claim 1, wherein determining the playback content of the media file comprises:
   determining a preset content category as a target content category; and
   determining playback content satisfying the target content category as the playback content of the media file.

4. The media file pushing method of claim 1, wherein the search information further comprises a content key word, and wherein determining the playback content of the media file comprises determining playback content comprising the content key word as the playback content of the media file based on the content key word.

5. The media file pushing method of claim 1, further comprising sending the target media file to another terminal.

6. A media file server, comprising:
   a memory comprising instructions; and
   a processor coupled to the memory, wherein the instructions cause the processor to be configured to:
      obtain search information from a user using a terminal, wherein the search information comprises time information, and wherein the time information indicates a requirement of the user on playback duration of a media file, wherein in a manner to obtain the search information, the instructions further cause the processor to be configured to:
         display, on a terminal, a plurality of time-based search fields for the user; and
         enable the user to select a time-based search field of the plurality of time-based search fields for searching the media file;
      determine playback content of the media file based on a preset content determining rule;
      obtain a target media file satisfying the time information and the playback content from a media file resource library based on the time information and the playback content of the media file; and
      present, on the terminal, the target media file in a pushing interface,
      wherein in a manner to obtain the target media file, the instructions further cause the processor to be configured to:
         search the media file resource library to determine whether the media file resource library comprises the target media file satisfying the time information and the playback content; and
         when the media file resource library does not comprise the target media file satisfying the time information and the playback content, collect statistics on the time information and the playback content of at least one media file having viewing frequency greater than or equal to a particular quantity of times; and edit the at least one media file into the target media file satisfying the time information and the playback content.

7. The media file server of claim 6, wherein the instructions further cause the processor to be configured to:

determine, based on a historical playback record of the user, at least one content category whose playback frequency of the user satisfies a preset requirement;

determine any one of the at least one content category as a target content category; and determine playback content satisfying the target content category as the playback content of the media file.

8. The media file server of claim 6, wherein the instructions further cause the processor to be configured to:

determine a preset content category as a target content category; and determine playback content satisfying the target content category as the playback content of the media file.

9. The media file server of claim 6, wherein the search information further comprises a content key word, and wherein the instructions further cause the processor to be configured to determine playback content comprising the content key word as the playback content of the media file based on the content key word.

10. The media file server of claim 6, wherein the instructions further cause the processor to be configured to send the target media file to another terminal.

11. A computer program product comprising a non-transitory computer readable storage medium, wherein the non-transitory computer readable storage medium comprises a computer executable program code, and wherein a computer executes the computer executable program code to:

obtain search information from a user using a terminal, wherein the search information comprises time information, and wherein the time information indicates a requirement of the user on playback duration of a media file, wherein in a manner to obtain the search information, the computer further executes the computer executable program code to:

display, on a terminal, a plurality of time-based search fields for the user; and enable the user to select a time-based search field of the plurality of time-based search fields for searching the media file;

determine playback content of the media file based on a preset content determining rule;

obtain a target media file satisfying the time information and the playback content from a media file resource library based on the time information and the playback content of the media file; and present, on the terminal, the target media file in a pushing interface, wherein in a manner of obtaining the target media file, the computer further executes the computer executable program code to:

search the media file resource library to determine whether the media file resource library comprises the target media file satisfying the time information and the playback content; and when the media file resource library does not comprise the target media file satisfying the time information and the playback content, collect statistics on the time information and the playback content of at least one media file having viewing frequency greater than or equal to a particular quantity of times; and edit the at least one media file into the target media file satisfying the time information and the playback content.

12. The computer program product of claim 11, wherein in a manner of determining the playback content of the media file, the computer further executes the computer executable program code to:

determine, based on a historical playback record of the user, at least one content category whose playback frequency of the user satisfies a preset requirement;

determine any one of the at least one content category as a target content category; and determine playback content satisfying the target content category as the playback content of the media file.

13. The computer program product of claim 11, wherein in a manner of determining the playback content of the media file, the computer further executes the computer executable program code to:

determine a preset content category as a target content category; and determine playback content satisfying the target content category as the playback content of the media file.

14. The computer program product of claim 11, wherein the search information further comprises a content key word, and wherein in a manner of determining the playback content of the media file, the computer further executes the computer executable program code to determine playback content comprising the content key word as the playback content of the media file based on the content key word.

15. The computer program product of claim 11, wherein the computer further executes the computer executable program code to send the target media file to another terminal.

16. A media file pushing system, comprising:

a terminal; and a media file server coupled to the terminal, wherein the media file server comprises:

a memory comprising instructions; and a processor coupled to the memory, wherein the instructions cause the processor to be configured to:

obtain search information from a user, wherein the search information comprises time information, and wherein the time information indicates a requirement of the user on playback duration of a media file, wherein in a manner to obtain the search information, the instructions further cause the processor to be configured to:

display a plurality of time-based search fields for the user; and enable the user to select a time-based search field of the plurality of time-based search fields for searching the media file;

determine playback content of the media file based on a preset content determining rule;

obtain a target media file satisfying the time information and the playback content from a media file resource library based on the time information and the playback content of the media; and present the target media file in a pushing interface file, wherein in a manner to obtain the target media file, the instructions further cause the processor to be configured to:

search the media file resource library to determine whether the media file resource library comprises the target media file satisfying the time information and the playback content; and when the media file resource library does not comprise the target media file satisfying the time information and the playback content, collect statistics on the time information and the playback content of at least one media file having viewing frequency greater than or equal to a particular quantity of times; and edit the at least one media file into the target media file satisfying the time information and the playback content; and wherein the terminal is configured to display the target media file pushed by the media file server.

17. The media file pushing system of claim 16, wherein the instructions further cause the processor of the media file server to be configured to:

determine, based on a historical playback record of the user, at least one content category whose playback frequency of the user satisfies a preset requirement;

determine any one of the at least one content category as a target content category; and determine playback content satisfying the target content category as the playback content of the media file.

18. The media file pushing system of claim 16, wherein the instructions further cause the processor of the media file server to be configured to:

determine a preset content category as a target content category; and determine playback content satisfying the target content category as the playback content of the media file.

19. The media file pushing system of claim 16, wherein the search information further comprises a content key word, and wherein the instructions further cause the processor of the media file server to be configured to determine playback content comprising the content key word as the playback content of the media file based on the content key word.

20. The media file pushing system of claim 16, wherein the instructions further cause the processor of the media file server to be configured to send the target media file to another terminal.

* * * * *